United States Patent
Farrell et al.

(10) Patent No.: US 8,898,413 B2
(45) Date of Patent: *Nov. 25, 2014

(54) POINT-IN-TIME COPYING OF VIRTUAL STORAGE

(75) Inventors: Mark S. Farrell, Pleasant Valley, NY (US); William J. Rooney, Hopewell Junction, NY (US); Elpida Tzortzatos, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 827 days.

This patent is subject to a terminal disclaimer.

(21) Appl. No.: 13/164,980

(22) Filed: Jun. 21, 2011

(65) Prior Publication Data

US 2012/0331261 A1 Dec. 27, 2012

(51) Int. Cl.
  *G06F 13/00* (2006.01)
  *G06F 11/36* (2006.01)
(52) U.S. Cl.
  CPC ....................................... *G06F 11/36* (2013.01)
  USPC .......................................... 711/163; 711/162
(58) Field of Classification Search
  None
  See application file for complete search history.

(56) References Cited

U.S. PATENT DOCUMENTS

| 5,592,618 | A | * | 1/1997 | Micka et al. ................... 714/54 |
| 6,557,089 | B1 | | 4/2003 | Reed et al. |
| 6,564,219 | B1 | * | 5/2003 | Lee et al. ....................... 707/769 |
| 6,654,880 | B1 | | 11/2003 | Yamamoto |
| 6,687,799 | B2 | | 2/2004 | Smullen et al. |
| 7,437,524 | B2 | | 10/2008 | Narayan et al. |
| 8,539,172 | B1 | * | 9/2013 | Winokur ........................ 711/154 |
| 2005/0228960 | A1 | * | 10/2005 | Francis et al. ................ 711/165 |
| 2007/0074065 | A1 | | 3/2007 | Suzuki |
| 2008/0294839 | A1 | | 11/2008 | Bell et al. |
| 2010/0180092 | A1 | * | 7/2010 | Rajaa et al. .................... 711/162 |
| 2011/0264878 | A1 | * | 10/2011 | Blea et al. ...................... 711/162 |
| 2012/0331261 | A1 | * | 12/2012 | Farrell et al. .................. 711/206 |

FOREIGN PATENT DOCUMENTS

| JP | 4359328 A | 12/1992 |
| JP | 9237207 A | 9/1997 |

* cited by examiner

*Primary Examiner* — Sean D Rossiter
(74) *Attorney, Agent, or Firm* — Cantor Colburn LLP; William A. Kinnaman, Jr.

(57) ABSTRACT

A method includes making in a real storage, a copy of a first page content stored in a first page data structure by creating a second page content in a second data structure, the second page content pointing to actual data pointed to by the first page content, storing the second page content in the second data structure, marking the first page content in the first page data structure with a page protection bit, wherein the page protection bit prevents a modification of the virtual page, in response to an attempt to modify the virtual page, copying the virtual page in the event the first page content in the first page data structure is marked with the page protection bit, storing the copied virtual page in a second virtual storage, and altering the second page content in the second data structure to point to the stored virtual page.

20 Claims, 4 Drawing Sheets

POINT-IN-TIME COPYING OF VIRTUAL STORAGE

BACKGROUND

The present invention relates to computer systems, and more specifically, to methods and systems of increasing computer system availability.

Computer systems often include a control application program that runs, in association with other application programs, in order to monitor data indicative of system operation. In the event of an error, the control application typically issues a command to take a snapshot image of the computer system's working memory, which is often used for subsequent error diagnosis, debugging and error prevention. However, the taking of the snapshot image often places the computer system in a non-dispatchable state, in which the application programs cannot run properly and time-outs may occur.

BRIEF SUMMARY

According to one embodiment of the present invention, a computer-implemented method for increasing computer system availability, the method includes making in a real storage, via a computer processor, a point-in-time copy of a first page content stored in a first page data structure by creating a second page content in a second data structure, the second page content pointing to actual data pointed to by the first page content, the first page content includes a location of a virtual page in a first virtual storage, storing the second page content in the second data structure, the first page data structure and the second page data structure being stored in the real storage, marking the first page content in the first page data structure with a point-in-time page protection bit, wherein the point-in-time page protection bit prevents a modification of the virtual page, in response to an attempt to modify the virtual page, copying the virtual page in the event the first page content in the first page data structure is marked with the point-in-time page protection bit, storing the copied virtual page in a second virtual storage, at least some of the second virtual storage is stored in the real storage, and altering the second page content in the second data structure to point to the stored virtual page, the second page content includes a location of the stored virtual page in the second virtual storage.

According to another embodiment of the present invention a system for increasing computer system availability includes a computer processor, and an application configured to execute on the computer processor, the application configured to perform a method, the method including making in a real storage, via a computer processor, a point-in-time copy of a first page content stored in a first page data structure by creating a second page content in a second data structure, the second page content pointing to actual data pointed to by the first page content, the first page content includes a location of a virtual page in a first virtual storage, storing the second page content in the second data structure, the first page data structure and the second page data structure being stored in the real storage, marking the first page content in the first page data structure with a point-in-time page protection bit, wherein the point-in-time page protection bit prevents a modification of the virtual page, in response to an attempt to modify the virtual page, copying the virtual page in the event the first page content in the first page data structure is marked with the point-in-time page protection bit, storing the copied virtual page in a second virtual storage, at least some of the second virtual storage is stored in the real storage, and altering the second page content in the second data structure to point to the stored virtual page, the second page content includes a location of the stored virtual page in the second virtual storage.

According to another embodiment of the present invention a non-transitory computer-readable storage medium including computer executable instructions that, when executed on a processor of a computer apparatus, direct the processor to perform a method for increasing computer system availability, the method includes making in a real storage, via a computer processor, a point-in-time copy of a first page content stored in a first page data structure by creating a second page content in a second data structure, the second page content pointing to actual data pointed to by the first page content, the first page content includes a location of a virtual page in a first virtual storage, storing the second page content in the second data structure, the first page data structure and the second page data structure being stored in the real storage, marking the first page content in the first page data structure with a point-in-time page protection bit, wherein the point-in-time page protection bit prevents a modification of the virtual page, in response to an attempt to modify the virtual page, copying the virtual page in the event the first page content in the first page data structure is marked with the point-in-time page protection bit, storing the copied virtual page in a second virtual storage, at least some of the second virtual storage is stored in the real storage, and altering the second page content in the second data structure to point to the stored virtual page, the second page content includes a location of the stored virtual page in the second virtual storage.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
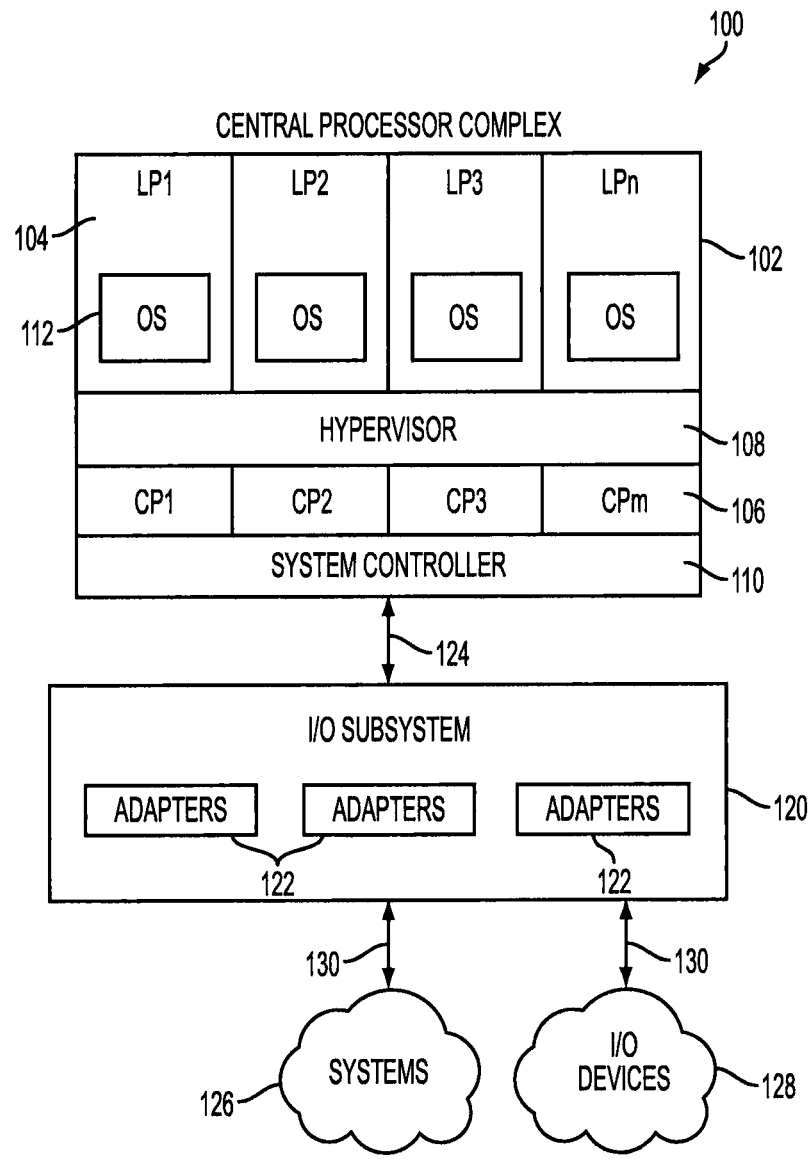
FIG. 1 illustrates a schematic diagram of an embodiment of a computing environment for use with an embodiment of the present invention.

While the description below describes the present invention with respect to mainframes, the present invention is not limited to mainframes. Rather, the present invention can be used in other computing environments as are known in the art.

Instant virtual copy (IVC) technology allows creation of point-in-time (PIT), full volume copies of data, with both the source and target IVC copies immediately available for read or write access. IVC technology works by creating a copy of a source volume on a target volume. The target volume copy is referred to herein as an IVC copy. IVC copies are typically used to create PIT copies of a source volume, i.e., the target volume represents a copy of the source volume, as it existed at some PIT.

When an IVC operation is initiated, a copy relationship is created between a source volume and target volume. An IVC relationship is a "mapping" of the PIT copy target volume to the PIT copy source volume. One example of this mapping is a bitmap representing the tracks on a target volume and a pointer to the source volume. When an IVC copy is made, the relationship between the target volume and the source volume is established via the pointer from the source volume to the target volume and a bitmap is created, which indicates which tracks on the target volume actually reside on the target volume. Thus, when data is requested from the target volume, the storage controller (or a storage unit) checks to see if the data is an IVC of another volume, by checking the pointer, and before reading the requested track, the storage controller checks the bitmap to determine whether the storage controller should read the data from the target volume, or if the requested data still resides on the source volume. Hence, a copy can be made by establishing the pointer to the source volume and clearing the bitmap, which indicates that all tracks on the target volume actually reside on the source volume. Thus, when the source volume is updated, a copy of the track is created on the target volume before the update is made, the corresponding bit in the bitmap on the target volume is turned on and the updated track is written to the source volume, so that subsequent requests to read that track from the target volume will cause the storage controller to now read the track from the target volume. This mapping allows an instant virtual point-in-time copy of that source volume to be copied to the associated target volume.

The IVC copy relationship exists between the target volume and the source volume from the time of the initiation of a IVC copy operation until the storage unit copies all data from the source volume to the target volume or the deletion of the IVC copy relationship. When the data is physically copied, a background process copies tracks from the source volume to the target volume. The amount of time the background copy requires to be completed depends on the amount of data being copied, the number of background copy processes that are occurring or any other activities that are occurring on the storage unit. In some cases, IVC technology is used without initiating an explicit background copy. For example, if the IVC copy was taken so that a PIT copy of the source volume may be made to another media, such as magnetic tape, the need for the IVC target often no longer exists once the copy to the magnetic tape is complete. Hence, the IVC copy relationship may be deleted before many tracks would have been updated on the source volume, and therefore copied to the target volume. Examples of IVC technology include IBM FlashCopy® and Hitachi ShadowImage®.

An auxiliary storage is physical storage used to keep copies of virtual storage pages in order to allow pages in real storage to be used by other programs. Auxiliary storage is typically slower and less expensive than real storage. Real storage is often RAM memory, while auxiliary storage often includes storage on direct access devices, such as disk drives, tape drives and flash storage. A block of auxiliary storage is a slot. Auxiliary storage is controlled by an auxiliary storage manager (ASM), which uses the system's page data sets to keep track of auxiliary storage slots. Specifically, ASM keeps track of slots for virtual storage pages that are not in central storage frames and reside in auxiliary storage slots, and also for slots for pages that occupy central storage frames, where copies reside in auxiliary storage slots. When a page-in or page-out is required, ASM works with a real storage manager (RSM) to locate the proper central storage frames and auxiliary storage slots. One example of the ASM is the Auxiliary Storage Manager of z/OS®. See IBM Corporation, "Introduction to the New Mainframe: z/OS Basics", Document No. SG24-6366-02, March 2011, section 3.4 "Virtual storage and other mainframe concepts," which is incorporated by reference herein.

A real storage is synchronously accessed physical storage and the processor must wait while data is retrieved from real storage. Often, real storage is referred to as random access memory (RAM). A block of real storage is a frame. Real storage is controlled by the RSM, which keeps track of the contents of real storage. The RSM manages the paging activities, such as page-in, page-out and page stealing, and helps with swapping an address space in or out. The RSM also performs page fixing, which is marking pages as unavailable to be paged out. One example of the RSM is the Real Storage Manager of z/OS®. See "Introduction to the New Mainframe: z/OS Basics", SG24-6366-02, section 3.4 "Virtual storage and other mainframe concepts".

A virtual storage is a type of storage that an operating system enables via real and auxiliary physical storages. A block of virtual storage is a page. Virtual storage is controlled by a virtual storage manager (VSM), which responds to requests to obtain and free virtual storage. The VSM also manages storage allocation for any program that must run in real, rather than virtual storage. Real storage is allocated to code and data when they are loaded in virtual storage. As the code and the data run, programs can request more storage by means of a system service. One example of the VSM is the Virtual Storage Manager of z/OS®. See "Introduction to the New Mainframe: z/OS Basics", SG24-6366-02, section 3.4 "Virtual storage and other mainframe concepts".

A page table is a data structure used by a virtual memory system in a computer operating system to store a map between a virtual address and a real address. While the description below describes the present invention embodiments with respect to a page table, the present invention embodiments are not limited to page tables only. Rather, the present invention embodiments may be used with other types of data structures used by a virtual memory system in a computer operating system to store a map between a virtual address and a real address.

A core dump is a recorded state of a working memory of a computer program at a specific time. Often, a core dump is initiated when a program has terminated abnormally. Core dumps are typically used to assist in diagnosing and debugging errors in computer programs.

A supervisor call (SVC) dump is a type of a core dump that provides a representation of a virtual storage for the system and is often invoked by an operating system when an abnormal condition, such as programming exception occurs. An SVC dump may be initiated manually, via an operator command or automatically invoked when a program detects an abnormal condition. Typically, an SVC dump process stores data in dump data sets that are pre-allocated or that the computer system allocates automatically, as needed.

A stand-alone (SA) dump is a type of a core dump that is used to collect diagnostic information about the entire system. The term stand-alone means that the dump is performed separately from normal system operations, and does not require the system to be in a condition for normal operation.

A translation lookaside buffer (TLB) is a central processing unit (CPU) cache that memory management hardware uses to improve virtual address translation speed.

FIG. 1 illustrates a schematic diagram of an embodiment of a computing environment for use with an embodiment of the present invention.

A processing environment 100 includes a central processor complex (CPC) 102 communicatively coupled to an input/output (I/O) subsystem 120.

Central processor complex 102 includes one or more logical partitions 104, such as logical partitions LP1-LPn, one or more central processors 106, such as CP1-CPm, a hypervisor 108, such as a logical partition manager, and a system controller 110.

Each logical partition 104 is capable of functioning as a separate system. Each logical partition may be independently reset, initially loaded with an operating system, if desired, and operate with different programs. In operation, an operating system or application program running in a logical partition appears to have access to a full and complete system, but in reality, only a portion of the system is available. A combination of hardware and firmware keeps a program in a logical partition from interfering with a program in a different logical partition. This type of isolation allows several different logical partitions to operate on a single processor, or multiple physical processors, in a time sliced manner.

Each logical partition may have an operating system 112. Alternatively, the resident operating system 112 may differ for one or more logical partitions. In one embodiment, operating system 112 is the z/OS® operating system. In one embodiment, each logical partition has assigned thereto a portion of system main storage (memory), which is referred to as a zone.

One or more of the logical partitions 104 may include one or more logical processors. Each central processor 106 may be permanently allocated to one of the logical processors for a partition, or may be in a pool of central processors 106 available for dynamic allocation to any of a group of logical processors.

Logical partitions 104 are managed by hypervisor 108, which is implemented by firmware running on one or more central processors 106. Logical partitions 104 and hypervisor 108 each comprise one or more programs residing in respective portions of real storage associated with the central processors. In an embodiment, hypervisor 108 is the Processor Resource/Systems Manager (PR/SM), offered by International Business Machines Corporation, Armonk, N.Y.

Central processors 106 are communicatively coupled to system controller 110. System controller 110 is, for instance, a hardware component that controls access to memory and caches within one of the one or more central processors 106 and communicates between one or more central processors 106 and I/O subsystem 120. System controller 110 queues, serializes and executes requests made by one or more central processors 106 and I/O subsystem 120. In one embodiment, system controller 110 sends commands to one or more central processors 106 and/or broadcasts commands to multiple central processors 106. System controller 110 does not execute user applications and is the communications mechanism between I/O subsystem 120 and central processors 106.

System controller 110 receives requests directly from I/O subsystem 120 and broadcasts commands based on those requests to central processors 106. I/O subsystem 120 includes one or more adapters 122, which forward requests directly to system controller 110.

I/O subsystem 120 is coupled to system controller 110 via one or more buses 124. I/O subsystem 120 is coupled to systems 126, such as another CPC, and/or I/O devices 128, such as a keyboard or a printer, via one or more digital communication links 130. In an embodiment, the links include one or more of Ethernet, Infiniband® and/or Fibre Channel links. Infiniband® is a registered trademark of the Infiniband Trade Association.

Adapters 122 of I/O subsystem 120 transform the protocol of system controller 110 to the protocols of the digital communication links (and vice versa) to allow efficient communication between CPC 102 and systems 126 and/or I/O devices 128.

In one embodiment, processing environment 100 is based, for instance, on the z/Architecture offered by International Business Machines Corporation, Armonk, N.Y. The z/Architecture is described in an IBM® publication entitled, "z/Architecture Principles of Operation," IBM Publication No. SA22-7832-08, August 2010, which is hereby incorporated herein by reference in its entirety. In one example, a processing environment based on the z/Architecture includes a System z® server, offered by International Business Machines Corporation, Armonk, N.Y. (IBM® and System z®, as well as z/OS® mentioned below, are registered trademarks of International Business Machines Corporation, Armonk, N.Y., U.S.A. Other names used herein may be registered trademarks, trademarks or product names of International Business Machines Corporation or other companies.)

Figure 2:
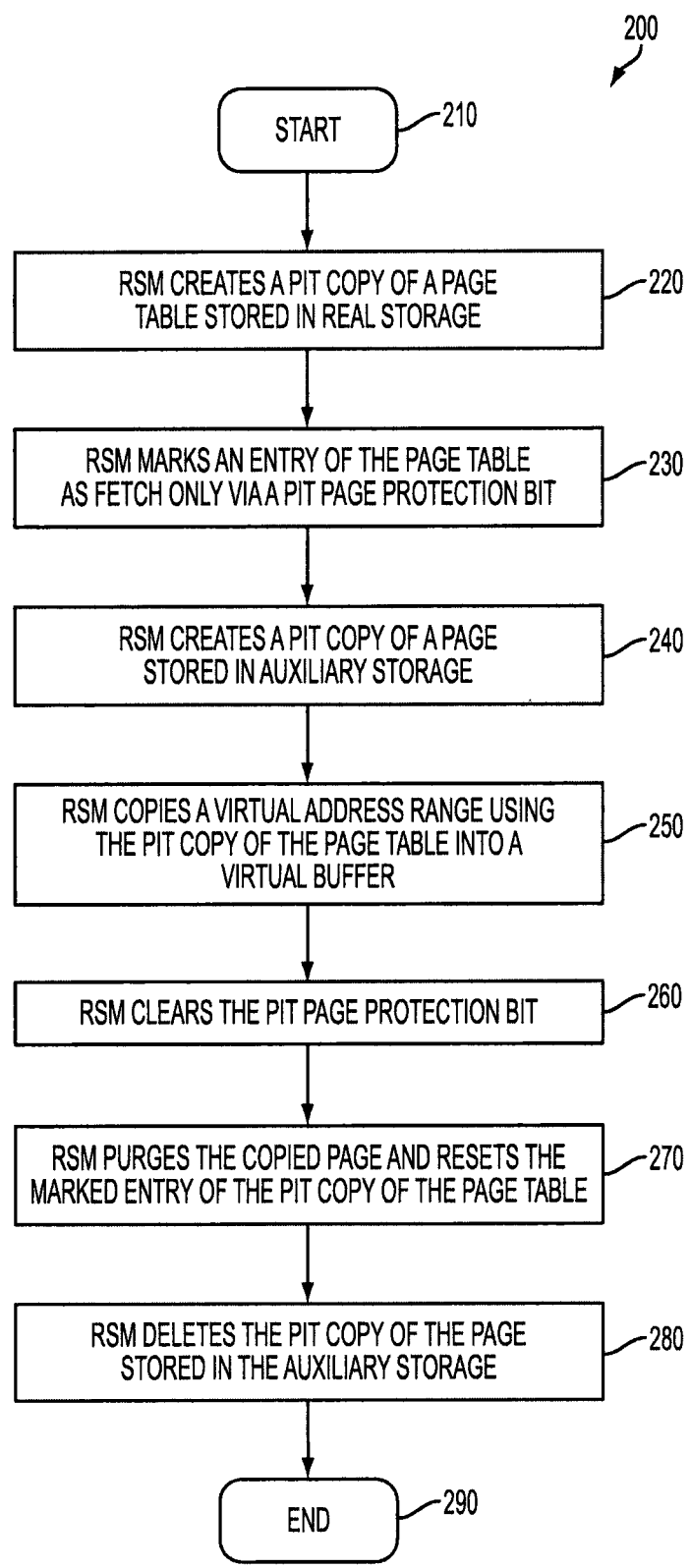
FIG. 2 illustrates a flowchart of an embodiment of a method of performing instant virtual copying of virtual storage.

FIG. 2 illustrates a flowchart of an embodiment of a method of performing instant virtual copying of virtual storage. In one embodiment, a process 200 is performed by the computer system of FIG. 1. Process 200 may be invoked automatically or manually.

Prior to invocation of process 200 or during a computer system initialization, such as an initial program load (IPL) processing or boot processing, an RSM reserves an amount of memory in the real storage. The amount of real storage that would need to be reserved would typically be a fraction of the real storage available to a logical partition. However, in an embodiment, if available real storage is used and becomes exhausted, then an auxiliary storage will be used.

In block 210, process 200 is invoked.

In block 220, the RSM creates a PIT copy of a page table stored in a real storage. In one embodiment, the PIT copy is created via an IVC process. The RSM copies an original page table (i.e., source table) to an alternate page table (i.e., target table) for later use. All the entries of the PIT copy of the page table continue to point to the original pages. When block 220 is invoked, the invoker of process 200 provides a range of virtual addresses to the PIT copy function to PIT copy. The PIT copy of the page table is stored in the reserved amount of memory in the real storage.

In block 230, in one embodiment, the RSM marks an entry of the page table as fetch only via a PIT page protection bit. In one embodiment, the RSM marks the original page table entry as fetch only (i.e., read only, cannot be updated) using a page protection bit in a page, a segment or a region table. After this marking, a PIT copy of real storage is created. In one embodiment, the marking of the original table entry as fetch only causes a TLB entry to be invalidated.

The PIT page protection bit is a PIT copy protection bit and is similar to a page table entry protection bit (PTEPROT). The PIT page protection bit indicates that the page is fetch only for the copy function. The protection bit could be implemented as either a hardware bit or a software bit. In doing this, a PIT copy of the real memory has been taken. At this point two sets of page tables exist i.e. the original page table (i.e., source table), and the page table that points to the PIT copy (i.e., PIT table).

In block 240, after the PIT copy of the page has been taken, a PIT copy of the page data set, which was not stored in the real storage, but instead was stored on the auxiliary storage at the time of the invocation of block 240, is created. The PIT copy of the page volume uses the existing auxiliary storage PIT copy support. In one embodiment, the PIT copy of the page stored on the auxiliary storage is established via an Establish command of IBM FlashCopy®. FlashCopy is described in "Method, System, and Program for Maintaining Electronic Data as of a Point-in-Time", U.S. Pat. No. 6,611,901 and in IBM Corporation, "IBM System Storage DS8800: Architecture and Implementation", Document No. SG24-8886-00, January 2011, both of which are incorporated by reference in their entirety. In one embodiment, prior to making of the PIT copy of the auxiliary storage, access to the auxiliary storage is halted. Then, the creation of the PIT copy relationship is performed relatively fast, such as less than 5 seconds for example, and involves creating a set pointer to a target volume and a bitmap representing tracks corresponding to the auxiliary storage. In one embodiment, the target volume is a reserved secondary volume. The pointer and the bitmap describe the PIT copy relationship between the auxiliary storage and the target volume. After the creation of the pointer and the bitmap, the auxiliary storage access is resumed and the source volume and the target volume can be independently referenced for read and write access. At this point, the auxiliary storage and the target volume are exact duplicates. Also, an application can immediately use the target volume via the pointer and the bitmap even though no physical data has yet been copied. The application is unaware that the target volume is not a "real" volume. In doing this, a PIT copy of auxiliary storage has been taken and a PIT copy of all of virtual memory is available, i.e., that which resides in real storage and that which resides on auxiliary storage. In one embodiment, block 220, block 230 and block 240, alone or in combination, are performed once for each entry in the page table. In another embodiment, block 220, block 230 and block 240, alone or in combination, are performed multiple times for each entry in the page table.

In block 250, the RSM copies a virtual address range using the PIT copy of the page table into a virtual buffer. In one embodiment, a virtual page may exist in the real storage or on the PIT copy of the auxiliary storage or both. The virtual address range is provided in block 210. The RSM, based on a setting of an option bit, makes the copy of the virtual address range from the PIT copy of the page table created in block 220. One skilled in the art would appreciate the fact that the virtual address range can be accessed directly without copying the data into intermediate virtual buffer.

In block 260, the RSM clears the PIT page protection bit in the source table. The clearing prevents the hardware from detecting a page protection exception and making a PIT copy of the page if the page has not been modified up to this point, assuming the invoker of process 200 is able to assure that the PIT page will only be accessed once. In one embodiment, if the invoker of process 200 is unable to assure that only one copy of the page is ever requested, then this block may be skipped and the PIT page protection bit will be cleared in block 270. In one embodiment, block 250 and block 260, alone or in combination, are repeated multiple times.

In block 270, when the caller of process 200 no longer needs the PIT copy, the RSM clears all page protection bits in the source table. In one embodiment, all page protection bits in the source table are cleared using a new command. The RSM purges the copied page and resets the page table. In one embodiment, the reserved amount of memory in the real storage is unreserved and thus released for use by other processes.

In block 280, the RSM deletes the PIT copy of the page stored in the auxiliary storage. In one embodiment, the storage is not deleted and the PIT copy relationship is maintained.

In block 290, process 200 ends. All PIT type functionality related to process 200 is turned off. In one embodiment, block 270, block 280 and block 290, alone or in combination, are performed once for each entry of the page table. In another embodiment, block 270, block 280 and block 290, alone or in combination, are performed multiple times for each entry in the page table.

Figure 3:
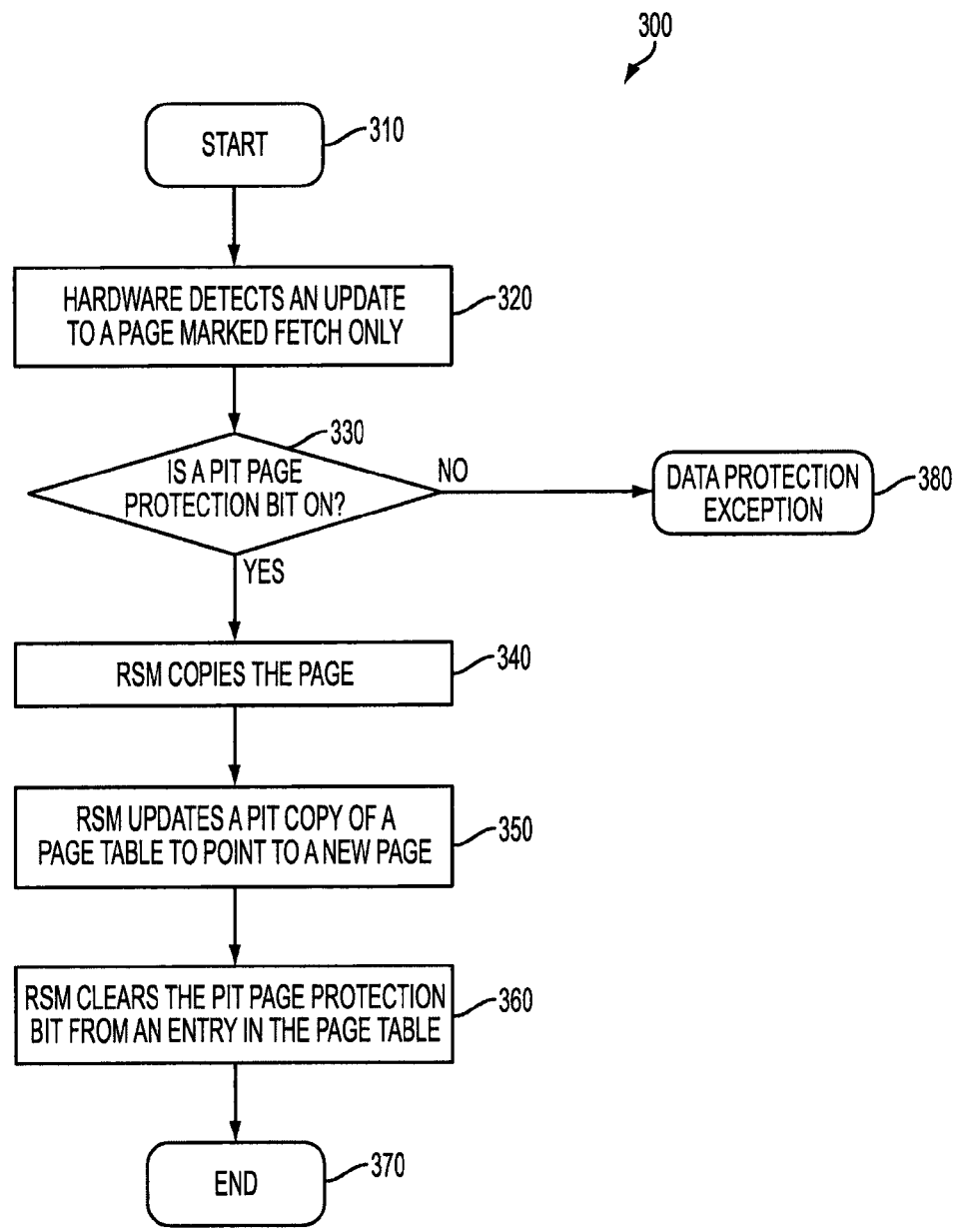
FIG. 3 illustrates a flowchart of an embodiment of a method of performing a page protection exception process.

FIG. 3 illustrates a flowchart of an embodiment of a method of performing a page protection exception process. In one embodiment, a process 300 is performed by the computer system of FIG. 1. In one embodiment, process 300 is performed within a computing environment in which process 200 is performed. Process 300 is invoked automatically or manually. In one embodiment, when an instruction is issued that attempts to modify a page marked "fetch" only, a "page protection exception" interrupt is recognized by the hardware causing the hardware to invoke process 300 to handle this exception.

In block, 310, process 300 is invoked.

In block 320, in one embodiment, a hardware device detects an attempt to update a page marked fetch only using either the existing fetch protect bit or the PIT protection bit described above.

In block 330, a decision is made if the PIT page protection bit is on. This decision is performed by the RSM and the RSM checks the reason for a page protection exception by checking the page table entry. If the PIT protection page bit is on, then process 300 continues to block 340. If the protection bit is not on, then process 300 will proceed to block 380 where data protection exception processing continues as known in the art.

In block 340, the RSM copies the page. The copying is done into the reserved amount of memory in the real storage as described above in reference to FIG. 2.

In block 350, the RSM updates the PIT copy of the page table (created, in one embodiment, in block 220 in FIG. 2) to point to a new page. The new page is the page created in block 340.

In block 360, the RSM clears the PIT page protection bit from an entry in the source page table. This clearing is done in order to indicate the copy of the page is finished. In one embodiment, this clearing causes a TLB entry to be cleared automatically.

In block 370, process 300 ends. The instruction that invoked process 300 is retried.

In block 380, data protection exception processing continues as known in the art.

In an exemplary embodiment, processes 200 and 300 are concurrently performed. The concurrent performance occurs because while process 200 is attempting to copy the pages before the pages get altered, an application program process or an operating system process may be running in parallel with process 200. Thus, if the application program process or the operating system process just access (read) the pages, then the application program process or the operating system process will execute normally. However, if the application program process or the operating system process try to modify the page, then page protection processing process is triggered and as described in reference to process 300, a hardware device checks to see if the page is fetch only by looking at the current page protection bits, such as PTEPROT, as well as the PIT page protection bit.

If the PIT page protection bit is on, then the hardware device raises a page protection exception, which causes process 300 to be performed. The PTEPROT bit prevents accidental or malicious modification of pages. However, since the execution of process 200 is neither accidental nor a malicious modification of the page, but rather a way of getting control to make a copy of the page before the page is altered, copying, if needed, is allowed. In one embodiment, process 200 does not modify any pages, but instead simply reads them. Thus, process 300 should not be triggered while simply copying pages.

Figure 4:
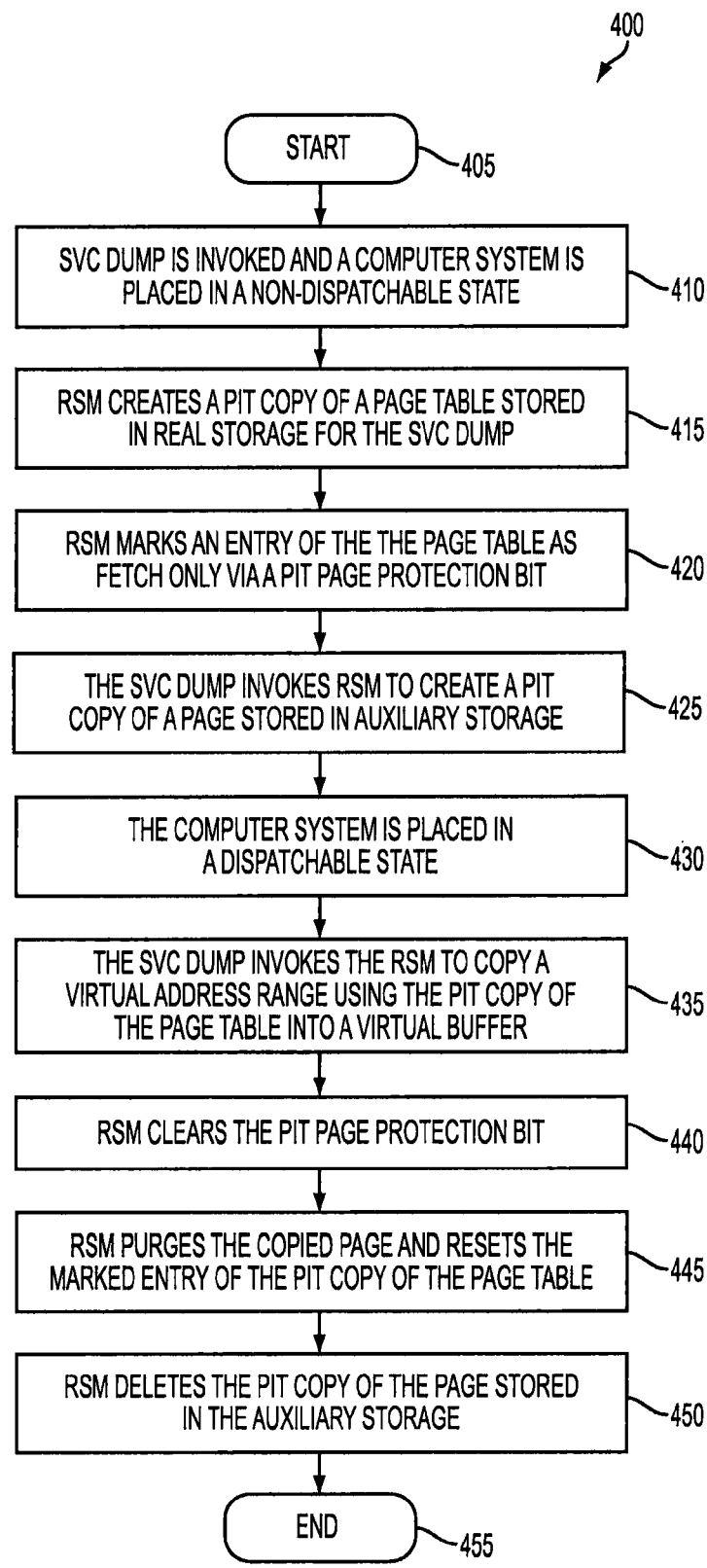
FIG. 4 illustrates a flowchart of an embodiment of a method of performing a supervisor call dump process that implements the method of point-in-time copying of real storage depicted in FIG. 2.

FIG. 4 illustrates a flowchart of an embodiment of a method of performing a supervisor call dump process that implements the method of performing instant virtual copying of virtual storage depicted in FIG. 2. In one embodiment, a process 400 is performed by the computer system of FIG. 1. Process 400 may be invoked automatically or manually.

Prior to invocation of process 400 or during a computer system initialization, such as an initial program load (IPL) processing or boot processing, an RSM reserves an amount of memory in the real storage. The amount of real storage that would need to be reserved would typically be a fraction of the real storage available to a logical partition being dumped because 1) it is unlikely that all address spaces, or all parts of an address space, will be dumped, and 2) it is likely that many pages will be copied to the dump data set before being modified, and therefore no copy will have been made. However, in an embodiment, if available real storage is used and becomes exhausted, then an auxiliary storage will be used.

In block 405, process 400 is invoked.

In block 410, an SVC dump process is invoked. This invocation places a computer system, for which the SVC dump was invoked, in a non-dispatchable state.

In block 415, the RSM creates a PIT copy of a page table stored in a real storage. The RSM initiates a PIT copy function to PIT copy an original page table (i.e., source table) to an alternate page table (i.e. target table) for later use. When block 415 is invoked, the SVC dump process provides a range of virtual addresses to the PIT copy function to PIT copy. The PIT copy of the page table is stored in the reserved amount of memory in the real storage.

In block 420, in one embodiment, the RSM marks an entry of the page table as fetch only via a PIT page protection bit. In one embodiment, the RSM marks the original page table entries as fetch only (i.e., read only, cannot be updated) using a PIT page protection bit in a page, a segment or a region table. After this marking, a PIT copy of real storage is created. In one embodiment, the marking of the original table entry as fetch only causes a TLB entry to be invalidated.

The PIT page protection bit is a PIT copy protection bit and is similar to a page table entry protection bit (PTEPROT). The PIT page protection bit indicates that the page is fetch only for the PIT copy function. The protection bit could be implemented as either a hardware bit or a software bit.

In block 425, the SVC dump invokes the RSM to create a PIT copy of a page stored in an auxiliary storage. The SVC dump process invokes the RSM to initiate, via an ASM, a PIT copy function to PIT copy a logical volume including a page data set. In one embodiment, the page is stored in a logical volume. After the PIT copy of the page has been taken, a PIT copy of the page data set, which was not stored in the real storage, but instead was stored on the auxiliary storage at the time of the invocation of block 425, is created. The PIT copy of the page volume uses the existing auxiliary storage PIT copy support. In one embodiment, the PIT copy of the page stored on the auxiliary storage is established via an Establish command of IBM FlashCopy®. Prior to making of the PIT copy of the auxiliary storage, access to the auxiliary storage is halted. Then, the creation of the PIT copy relationship is performed relatively fast, such as less than 5 seconds, and involves creating a pointer, to a target volume and a bitmap representing tracks corresponding to the auxiliary storage. In one embodiment, the target volume is a reserved secondary volume. The pointer and the bitmap describe the PIT copy relationship between the auxiliary storage and the target volume. After the creation of the pointer and the bitmap, the auxiliary storage access is resumed and the source volume and the target volume can be independently referenced for read and write access. At this point, the auxiliary storage and the target volume are exact duplicates. Also, an application can immediately use the target volume via the new pointers even though no physical data has yet been copied.

In block 430, the computer system, for which the SVC dump process was invoked, is placed into a dispatchable state.

In block 435, the SVC dump process invokes the RSM to copy a virtual address range using the PIT copy of the page table into a virtual buffer. The virtual address range is provided in block 415. The RSM, based on a setting of an option bit, makes the copy of the virtual address range from the PIT copy of the page table created in block 415. One skilled in the art would appreciate the fact that the virtual address range can be accessed directly without copying the data into an intermediate virtual buffer.

In block 440, the RSM clears the PIT page protection bit. The clearing prevents the RSM from needlessly copying the page if the page had not been modified up to this point. In one embodiment, the SVC dump assures that only one copy of the page is requested.

In block 445, the RSM purges the copied page and resets the marked entry of the PIT copy of the page table. The purging and the resetting are performed because the SVC dump no longer needs the copied page. In one embodiment, the RSM clears the remaining PIT page protection bits, purges the copied pages and resets the marked entries of the PIT copy of the page table. In one embodiment, the reserved amount of memory in the real storage is unreserved and thus released.

In block, 450, the RSM deletes the PIT copy of the page stored in the auxiliary storage.

In block 455, process 400 ends. All PIT type functionality related to process 400 is turned off.

In one embodiment, if available real storage is used and becomes exhausted, then pages will be made available by paging out to the auxiliary storage. A certain amount of real storage is reserved for use in the PIT copy for the SVC dump process. This amount could be very small if the RSM is modified to make a copy of a page with the PIT page protection bit on. However, if there are no real pages left to make a copy to, then the RSM could copy the unmodified page to the auxiliary storage (i.e. paging volumes) that represent the copy of the paging volumes. Then, the RSM could update the page table that represents the copy and clear the PIT page protection bit.

In one embodiment, if available real storage is used and becomes exhausted, then pages will be made available by paging out to the auxiliary storage. A certain amount of real storage is reserved for use in the PIT copy for the SVC dump process. This amount could be very small if the RSM is modified to select a page with the protection bit on to be pushed out to the auxiliary storage. Then, the RSM could copy the unmodified page to both auxiliary storage copies and update both sets of pages tables and clear the PIT page protection bits. Thus, if the page is forced out to the auxiliary storage, there is no need to reset the protection bit when the page is brought back into the real storage.

In one embodiment, the PIT copy of the paging volume could be done using a space efficient feature of the PIT copy technology. One example of this feature is Space Efficient FlashCopy®. This feature depends on a statistical unlikelihood that all pages in the paging volume will be modified before the need for the copy is eliminated (i.e., when the SVC dump process ends).

In one embodiment, the processes described above are implemented with a stand-alone dump.

Quiescing is pausing or stopping all currently running programs in order to prevent their accessing the processor memory and then implementing a dump of the data contents of the processor memory to another memory or storage device. The suspension of access to the processor memory during the dumping (copying) process is needed in order to prevent the memory contents changing (being modified/updated) during the dumping process, which would otherwise corrupt the data and render it useless as a point-in-time image of the processor memory data content. Currently, in order to prevent modification of relevant data between the time the SVC dump process is invoked and the time the relevant data is captured (i.e., copied to the dump data set), a computer programmer can specify QUIESCE=YES on the SVC dump invocation. This will set the system non-dispatchable until common storage is captured. All address spaces being dumped are made non-dispatchable until those address spaces are captured for both QUIESCE=YES and QUIESCE=NO. However, even if QUIESCE=YES is specified, most of memory is not captured during the time the system is non-dispatchable, and often data critical to debugging the problem can be lost due to modification once the system is set dispatchable again. Thus, in one embodiment, copies are made of the real storage and the paging data sets much closer to the time of error than with current SVC dump processing. This increases the likelihood of determining the actual cause of an error on first failure, i.e., the event that triggered SVC dump invocation. This should substantially reduce the necessity of a stand-alone dump as a problem determination tool.

In one embodiment, the task to do the actual data copying of data from the copy of the real storage and the copy of the paging data sets from the auxiliary storage to the SVC dump data set could be run under a processor other than the general purpose processor. This would also reduce the impact on other applications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for increasing computer system availability, the method comprising:
    making in a real storage, via a computer processor, a point-in-time copy of a first page content stored in a first page data structure by creating a second page content in a second page data structure, the second page content pointing to actual data pointed to by the first page content, wherein the first page content includes a location of a virtual page in a first virtual storage;
    storing the second page content in the second page data structure, the first page data structure and the second page data structure being stored in the real storage;
    marking the first page content in the first page data structure with a point-in-time page protection bit, wherein the point-in-time page protection bit prevents a modification of the virtual page;
    in response to an attempt to modify the virtual page, in the event the first page content in the first page data structure is marked with the point-in-time page protection bit:
        copying the virtual page;
        storing the copied virtual page in a second virtual storage, at least some of the second virtual storage is stored in the real storage; and
        altering the second page content in the second page data structure to point to the stored virtual page, wherein the second page content includes a location of the stored virtual page in the second virtual storage.

2. The method of claim 1, further comprising:
    halting access of a first process accessing a first virtual storage before making the point-in-time copy of the first page content; and
    granting access to the first process to access the first virtual storage after marking the first page content, and wherein the making of the point-in-time copy is performed by a second process different from the first process, wherein the second process is allowed to access the first virtual storage.

3. The method of claim 2, further comprising clearing the point-in-time page protection bit of the first page content in the first page data structure after the altering of the second page content in the second page data structure to point to the stored virtual page and reserving an address range in the real storage to store the second page content of the second page data structure, wherein the reservation is performed during a computer system initialization and prior to the halting of the access of the first process accessing to the first virtual storage, the first page data structure is a first page table and the second page data structure is a second page table.

4. The method of claim 1, wherein the marking the data of the first page content in the first page data structure with the point-in-time page protection bit is performed after an invocation of a core dump process.

5. The method of claim 4, wherein the core dump process is a supervisor call dump process or a stand-alone dump process, wherein the first or the second virtual storage includes an auxiliary storage which is used for paging if the real storage becomes exhausted and wherein the core dump process copies the virtual page referenced by the second page content.

6. The method of claim 1, wherein the marking the data of the first page content in the first page data structure with the point-in-time page protection bit causes a translation lookaside buffer entry to be invalidated.

7. The method of claim 1, wherein the marking the data of the first page content in the first page data structure with the point-in-time page protection bit is performed using the point-in-time page protection bit in at least one of a page table, a segment table or a region table.

8. A system for increasing computer system availability, comprising:
a computer processor; and
an application configured to execute on the computer processor, the application configured to perform a method, the method includes:
making in a real storage, via the computer processor, a point-in-time copy of a first page content stored in a first page data structure by creating a second page content in a second page data structure, the second page content pointing to actual data pointed to by the first page content, wherein the first page content includes a location of a virtual page in a first virtual storage;
storing the second page content in the second page data structure, the first page data structure and the second page data structure being stored in the real storage;
marking the first page content in the first page data structure with a point-in-time page protection bit, wherein the point-in-time page protection bit prevents a modification of the virtual page;
in response to an attempt to modify the virtual page, in the event the first page content in the first page data structure is marked with the point-in-time page protection bit:
copying the virtual page;
storing the copied virtual page in a second virtual storage, at least some of the second virtual storage is stored in the real storage; and
altering the second page content in the second page data structure to point to the stored virtual page, wherein the second page content includes a location of the stored virtual page in the second virtual storage.

9. The system of claim 8, wherein the application is further configured to halt access of a first process accessing a first virtual storage before making the point-in-time copy of the first page content, and grant access to the first process to access the first virtual storage after marking the first page content, and wherein the making of the point-in-time copy is performed by a second process different from the first process, wherein the second process is allowed to access the first virtual storage.

10. The system of claim 9, wherein the application is further configured to clear the point-in-time page protection bit of the first page content in the first page data structure after the altering of the second page content in the second page data structure to point to the stored virtual page and reserving an address range in the real storage to store the second page content of the second page data structure, wherein the reservation is performed during a computer system initialization and prior to the halting of the access of the first process accessing to the first virtual storage, the first page data structure is a first page table the second page data structure is a second page table.

11. The system of claim 8, wherein the marking the data of the first page content in the first page data structure with the point-in-time page protection bit is performed after an invocation of a core dump process.

12. The system of claim 11, wherein the core dump process is a supervisor call dump process or a stand-alone dump process, wherein the first or the second virtual storage includes an auxiliary storage which is used for paging if the real storage becomes exhausted and wherein the core dump process copies the virtual page referenced by the second page content.

13. The system of claim 8, wherein the marking the data of the first page content in the first page data structure with the point-in-time page protection bit causes a translation lookaside buffer entry to be invalidated.

14. The system of claim 8, wherein the marking the data of the first page content in the first page data structure with the point-in-time page protection bit is performed using the point-in-time page protection bit in at least one of a page table, a segment table or a region table.

15. A non-transitory computer-readable storage medium including computer executable instructions that, when executed on a processor of a computer apparatus, direct the processor to perform a method for increasing computer system availability, the method comprising:
making in a real storage, via a computer processor, a point-in-time copy of a first page content stored in a first page data structure by creating a second page content in a second page data structure, the second page content pointing to actual data pointed to by the first page content, wherein the first page content includes a location of a virtual page in a first virtual storage;
storing the second page content in the second page data structure, the first page data structure and the second page data structure being stored in the real storage;
marking the first page content in the first page data structure with a point-in-time page protection bit, wherein the point-in-time page protection bit prevents a modification of the virtual page;
in response to an attempt to modify the virtual page, in the event the first page content in the first page data structure is marked with the point-in-time page protection bit:
copying the virtual page;
storing the copied virtual page in a second virtual storage, at least some of the second virtual storage is stored in the real storage; and
altering the second page content in the second page data structure to point to the stored virtual page, wherein the second page content includes a location of the stored virtual page in the second virtual storage.

16. The non-transitory computer-readable storage medium of claim 15, the method further comprising:
halting access of a first process accessing a first virtual storage before making the point-in-time copy of the first page content; and
granting access to the first process to access the first virtual storage after marking the first page content, and wherein the making of the point-in-time copy is performed by a second process different from the first process, wherein the second process is allowed to access the first virtual storage.

17. The non-transitory computer-readable storage medium of claim 16, the method further comprising clearing the point-in-time page protection bit of the first page content in the first page data structure after the altering of the second page content in the second page data structure to point to the stored virtual page and reserving an address range in the real storage to store the second page content of the second page data structure, wherein the reservation is performed during a computer system initialization and prior to the halting of the access of the first process accessing to the first virtual storage, the first page data structure is a first page table and the second page data structure is a second page table.

18. The non-transitory computer-readable storage medium of claim 15, wherein the marking the data of the first page content in the first page data structure with the point-in-time page protection bit is performed after an invocation of a core dump process.

19. The non-transitory computer-readable storage medium of claim 18, wherein the core dump process is a supervisor call dump process or a stand-alone dump process, wherein the first or the second virtual storage includes an auxiliary storage which is used for paging if the real storage becomes exhausted and wherein the core dump process copies the virtual page referenced by the second page content.

20. The non-transitory computer-readable storage medium of claim 15, wherein the marking the data of the first page content in the first page data structure with the point-in-time page protection bit causes a translation lookaside buffer entry to be invalidated.

\* \* \* \* \*